US007193196B2

(12) United States Patent
Ouellette (10) Patent No.: US 7,193,196 B2
(45) Date of Patent: Mar. 20, 2007

(54) METHODS AND SYSTEMS FOR EVALUATING OPTICAL SYSTEMS

(75) Inventor: Patrick Ouellette, Lanark (CA)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 10/976,957

(22) Filed: Oct. 29, 2004

(65) Prior Publication Data

US 2005/0094133 A1    May 5, 2005

Related U.S. Application Data

(60) Provisional application No. 60/515,242, filed on Oct. 29, 2003.

(51) Int. Cl.
    *G02B 27/64* (2006.01)
(52) U.S. Cl. ............... 250/201.8; 250/201.2; 356/4.09; 348/349; 348/354; 348/356
(58) Field of Classification Search ........... 250/201.2, 250/201.3, 201.7, 201.8; 382/255; 356/4.03, 356/4.04, 4.09; 348/345, 349, 350, 354–356
    See application file for complete search history.

(56) References Cited

U.S. PATENT DOCUMENTS

| 4,153,834 A | | 5/1979 | Hayamizu ............... 250/201 |
|---|---|---|---|
| 4,325,082 A | | 4/1982 | Griesshaber ............ 358/218 |
| 4,464,681 A | * | 8/1984 | Jacobs et al. ........... 358/406 |
| 4,751,376 A | * | 6/1988 | Sugiura et al. ......... 250/201.8 |
| 4,912,567 A | * | 3/1990 | Nakajima et al. ........... 358/451 |
| 5,087,537 A | | 2/1992 | Conway et al. ............... 430/15 |
| 5,307,175 A | * | 4/1994 | Seachman ................... 358/401 |
| 5,572,444 A | | 11/1996 | Lentz et al. ........... 364/551.01 |
| 5,661,816 A | | 8/1997 | Fantone et al. ............. 382/100 |
| 5,966,208 A | * | 10/1999 | Samuelson ................... 356/124 |
| 6,483,950 B1 | | 11/2002 | Wallack ..................... 382/285 |
| 6,535,307 B1 | | 3/2003 | Allen et al. ................. 358/504 |
| 6,567,570 B1 | | 5/2003 | Steinle et al. ............... 382/312 |
| 6,577,344 B2 | | 6/2003 | Kadohara et al. ........... 348/350 |
| 2002/0140990 A1 | * | 10/2002 | Liu .......................... 358/406 |
| 2003/0030854 A1 | * | 2/2003 | Huang et al. ............... 358/498 |
| 2003/0067595 A1 | | 4/2003 | Alderson et al. ........ 356/124.5 |

OTHER PUBLICATIONS

Dainty, J.C. et al. (1974) Image Science: Principles, Analysis and Evaluation of Photographic-type Imaging Processes. New York: Academic Press, Inc. pp. 232-258.

(Continued)

*Primary Examiner*—Thanh X. Luu
*Assistant Examiner*—Stephen Yam
(74) *Attorney, Agent, or Firm*—Burns & Levinson LLP; Jacob N. Erlich; Orlando Lopez (57) ABSTRACT

Systems and method for determining, based on a gray scale image, focus of an imaging system. A method of this invention includes the steps of: a) acquiring a gray scale image of a test target, b) binarizing the acquired gray scale image, c) analyzing the binarized acquired image, d) adjusting focus of acquisition optics of the imaging system, and e) repeating steps a) through d) until a substantially maximum number of line pairs of a number of groups of line pairs of the test target is obtained, wherein each group from the number of groups of line pairs has a predetermined spatial frequency.

8 Claims, 11 Drawing Sheets

OTHER PUBLICATIONS

U.S. Appl. No. 60/515,242, filed Oct. 29, 2003 entitled: Method for Evaluating Optical System. Inventor: Patrick Ouellette.

Memorandum from O. Lopez, Attorney for Applicant dated Oct. 25, 2005.

* cited by examiner

METHODS AND SYSTEMS FOR EVALUATING OPTICAL SYSTEMS

CROSS REFERENCE TO RELATED APPLICATIONS

This application claims priority of U.S. Provisional Application 60/515,242 filed on Oct. 29, 2003, which is herein incorporated by reference.

BACKGROUND OF THE INVENTION

This invention relates generally to optical system evaluation.

In operation, manufacturing and calibration of systems including optical subsystems, the operations of determining and setting desired focus are typically included. While many complex methods of determining and setting desired focus are available, there is a need for simple repeatable methods for determining and setting desired focus. Methods for determining the desired focus based on a gray scale image that rely on human judgment are subject to user interpretation. There is a need for a repeatable, simple method for determining the desired focus of an imaging system based on a gray scale image.

SUMMARY OF THE INVENTION

Systems and methods for determining, based on a gray scale image, focus of an imaging system are disclosed.

An embodiment of a method of this invention includes the steps of: a) acquiring a gray scale image of a test target, b) binarizing the acquired gray scale image, c) analyzing the binarized acquired image, d) adjusting focus of acquisition optics of the imaging system, and e) repeating steps a) through d) until a substantially maximum number of line pairs of a number of groups of line pairs of the test target is obtained, wherein each group from the number of groups of line pairs has a predetermined spatial frequency, whereby focus of the imaging system is determined.

An embodiment of a test target of this invention includes a number of groups of line pairs, each group having a predetermined spatial frequency, one predetermined spatial frequency of one group is selected to exceed a spatial frequency substantially equal to a predetermined value, a maximum desired resolution in one embodiment.

For a better understanding of the present invention, together with other and further objects thereof, reference is made to the accompanying drawings and detailed description.

DETAILED DESCRIPTION OF THE EMBODIMENTS

Systems and method for determining, based on a gray scale image, focus of an imaging system are disclosed hereinbelow.

Figure 1:
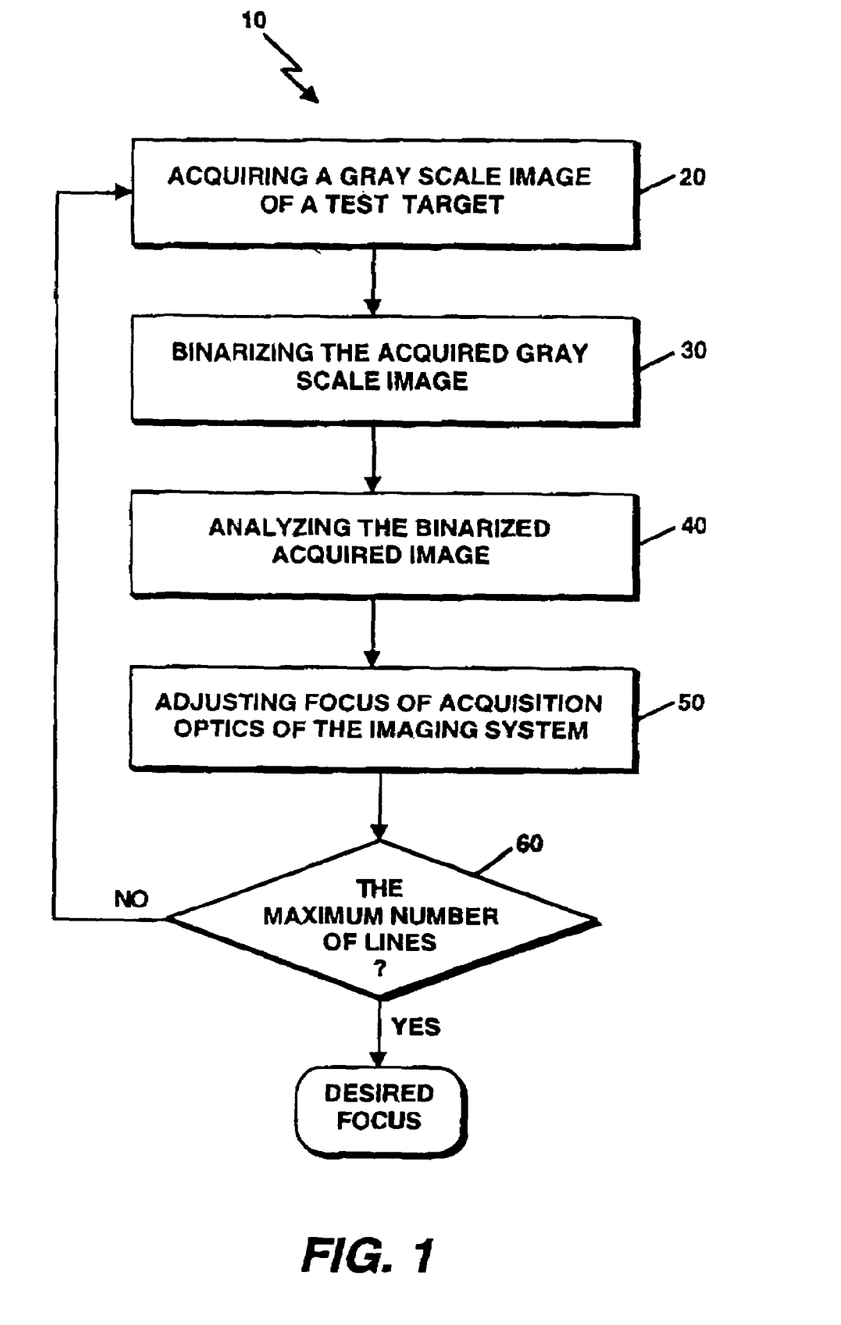
FIG. 1 is a schematic flowchart representation of an embodiment of the method of this invention.

FIG. 1 is a flowchart representation of an embodiment 10 of the method of this invention. Referring to FIG. 1, an embodiment of the method of this invention includes the steps of: a) acquiring a gray scale image of a test target (step 20, FIG. 1), b) binarizing the acquired gray scale image (step 30, FIG. 1), c) analyzing the binarized acquired image (step 40, FIG. 1), d) adjusting focus of acquisition optics of the imaging system (step 50, FIG. 1), and e) repeating steps a) through d) until a substantially maximum number of line pairs of a number of groups of line pairs of the test target is obtained (step 60, FIG. 1), wherein each group from the number of groups of line pairs has a predetermined spatial frequency.

The substantially maximum number of line pairs (or equivalently line pair groups) appearing in the binarized image represents the desired focus of the imaging system.

Figure 2:
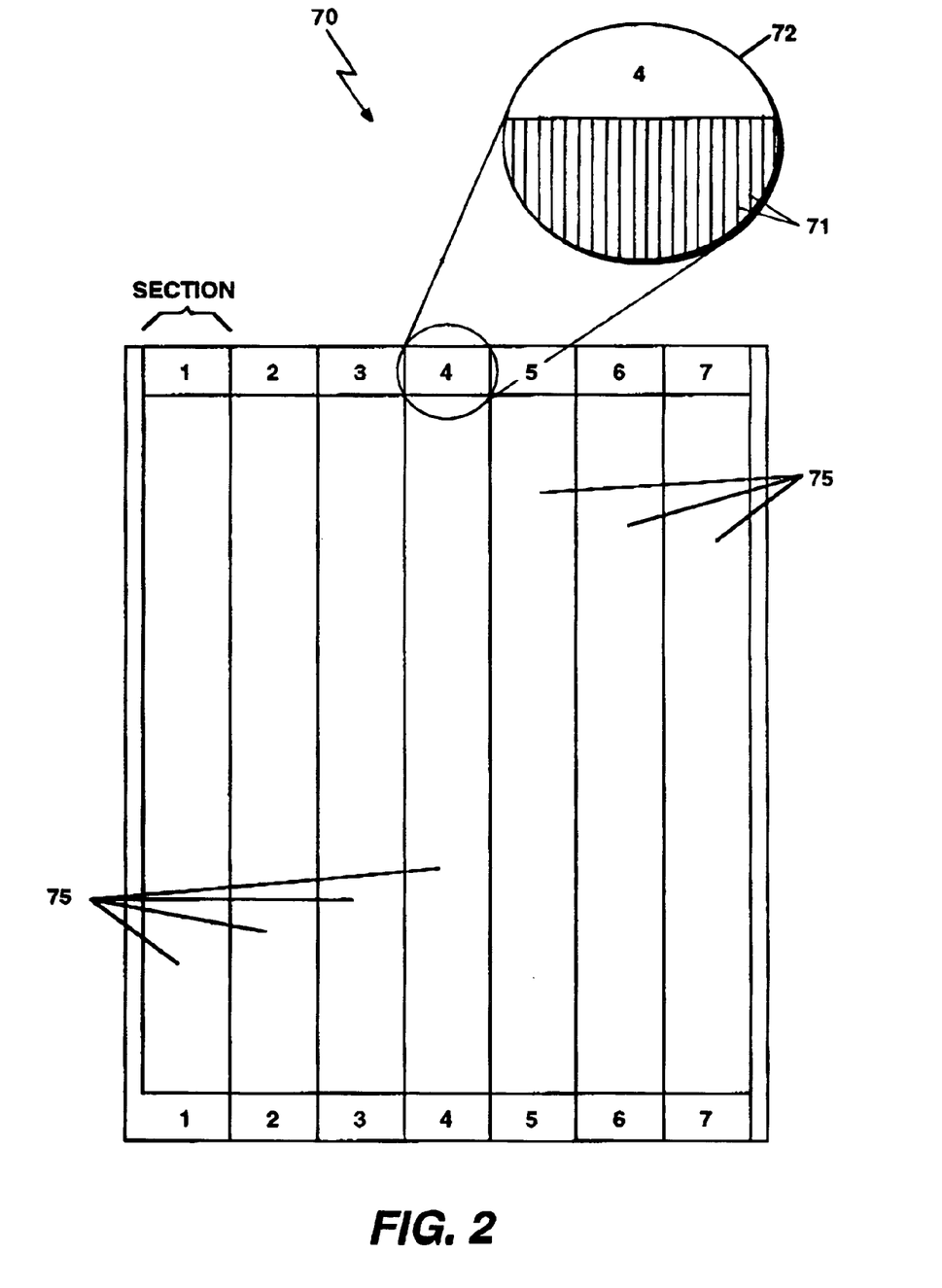
FIGS. 2 is a schematic representation of an embodiment of a test target of this invention.

FIG. 2 is a schematic representation of an embodiment 70 of a test target of this invention. Referring to FIG. 2, the embodiment 70 of a test target of this invention includes a number of groups 75 of line pairs, each group having a predetermined spatial frequency. The predetermined spatial frequency of one group is different from the predetermined spatial frequency of the adjacent groups. One predetermined spatial frequency of one group exceeds a spatial frequency substantially equal to a predetermined value, a maximum desired resolution (for example, but not limited to, a predetermined number of dots per inch) in this embodiment. Although seven groups are shown in FIG. 2, the number of groups is not a limitation of this invention. A section 72 of the test target 70 is shown in FIG. 2. The line pairs 71 in each group are shown in FIG. 2. A line pair is one cycle of a light bar and dark bar of equal width. Using an 8 bit gray scale to generate the test target, 0 represents the dark bar whereas 255 represents the light bar.

Figure 3:
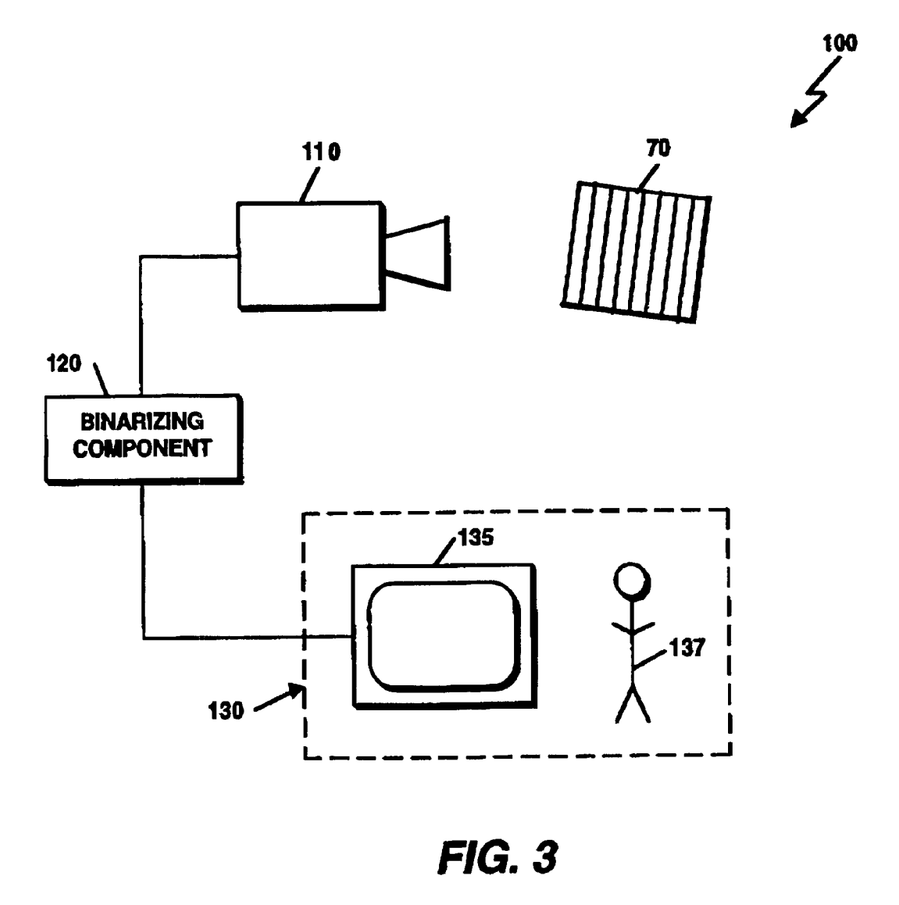
FIG. 3 is a block diagram representation of an embodiment of the system of this invention.

A block diagram of an embodiment 100 of the system of this invention is shown in FIG. 3. Referring to FIG. 3, the embodiment 100 of the system of this invention includes the test target 70 described hereinabove. An image acquisition component 110 of the imaging system is capable of acquiring a gray scale image of the test target. The embodiment 100 also includes a binarizing component 120 capable of binarizing the acquired gray scale image and means 130 for analyzing the binarized acquired image. The analyzing means 130 are capable of determining a number of line pair groups obtained. In the embodiment shown in FIG. 3, the analyzing means 130 include a display 135 that is read by an observer 137.

Figure 4A:
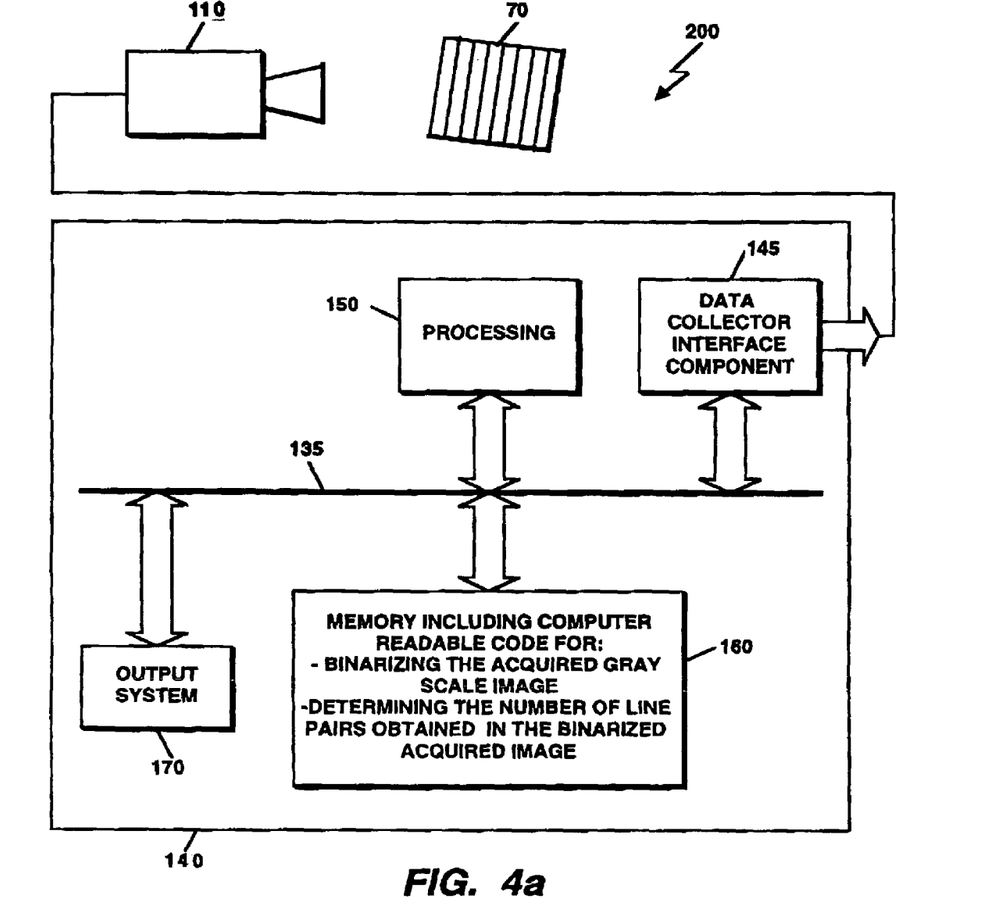
FIGS. 4a and 4b are block diagram representations of two other embodiments of the system of this invention.

A block diagram of an embodiment 200 of the system of this invention is shown in FIG. 4a. Referring to FIG. 4a, the embodiment 200 of the system of this invention includes the test target 70 described hereinabove. The image acquisition component 110 of the imaging system is capable of acquiring a gray scale image of the test target. The embodiment 200 also includes a processing subsystem 140. In the embodiment 200 of FIG. 4a, the image acquisition component 110 is operatively connected to a data acquisition interface component 145 (in some embodiments the data acquisition interface component 145 is incorporated in the image acquisition component 110). The embodiment 200 of FIG. 4a also includes one or more processors 150, an output system 170, and one or more other computer readable memories 160 (also referred to as computer usable media) having computer readable code embodied therein. The computer readable code is capable of causing the one or more processors 150 to binarize the acquired gray scale image, and determine the number of line pairs obtained in the binarized acquired image. An embodiment 300 is also possible, shown in FIG. 4b in which the binarization is accomplished by a binarizing component 180 and one or more other computer readable memories 190 (also referred to as computer usable media) have computer readable code embodied therein, the computer readable code being capable of causing the one or more processors 150 to determine the number of line pairs obtained in the binarized acquired image.

Figure 4B:
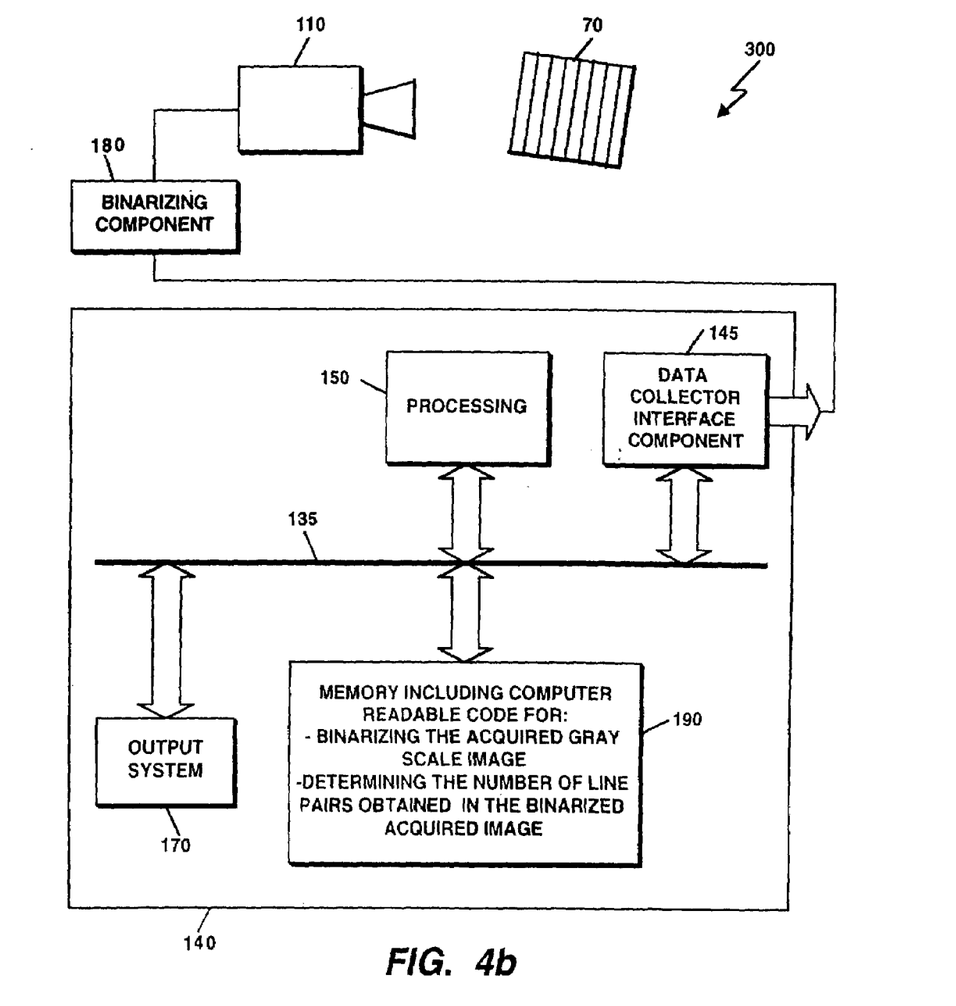

The one or more processors 150, the one or more computer readable memories 160 or 190, the output system 170, and the data collector interface component 145 are operatively connected to each other by interconnection means 135 (a common bus, in one embodiment).

In one embodiment, the binarizing component includes an edge detection binarizer (see, for example, but not limited to, Moon-Soo Chang, Sun-Mee Kang, Woo-Sik Rho, Heok-Gu Kim, Duck-Jin Kim, "Improved binarization algorithm for document image by histogram and edge detection", *Proceedings of the Third International Conference on Document Analysis and Recognition,* 1995 and references therein). The edge detection binarizer can be implemented in hardware, software (code) or a combination of hardware and software.

Figure 5:
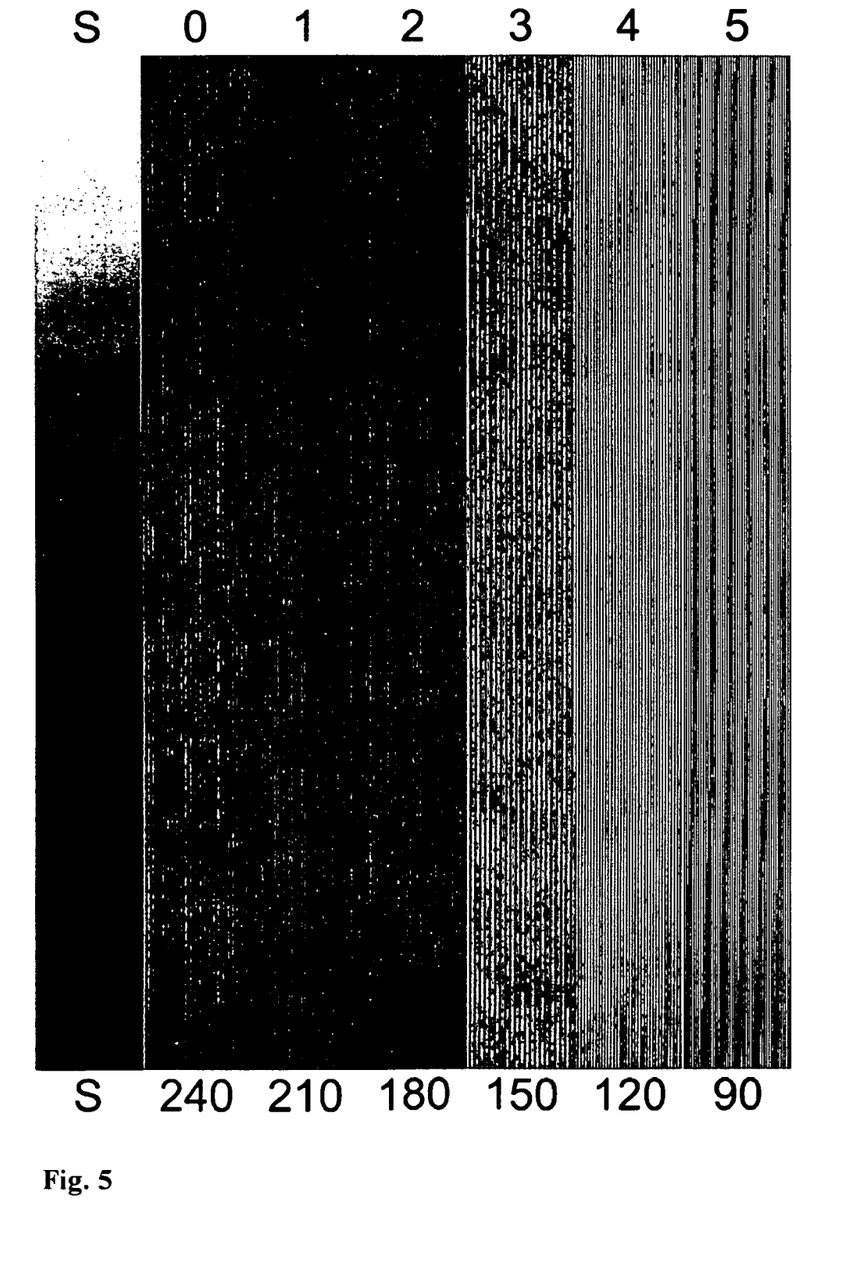
FIG. 5 is a pictorial representation of a gray scale image of a test target in substantially desired focus.
Figure 6:
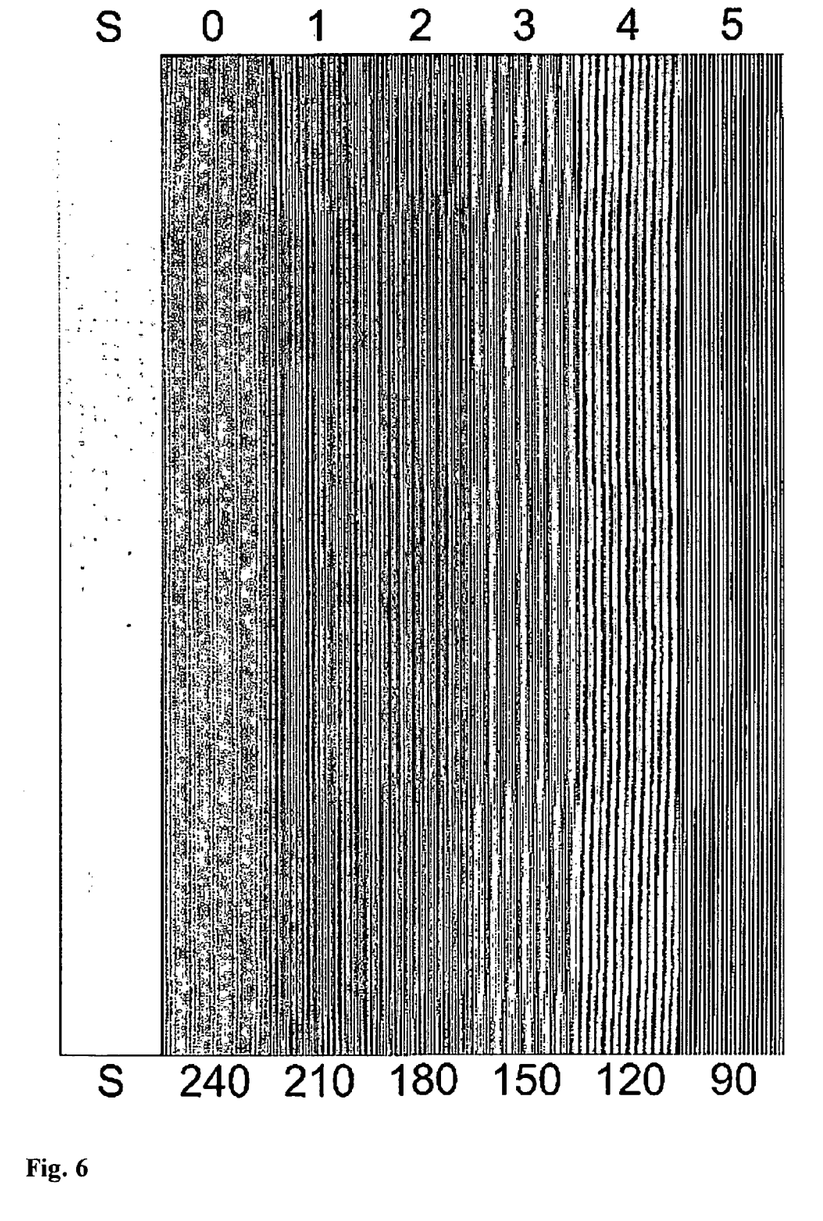
FIG. 6 is a pictorial representation of a binarized gray scale image of a test target in substantially desired focus.
Figure 7A:
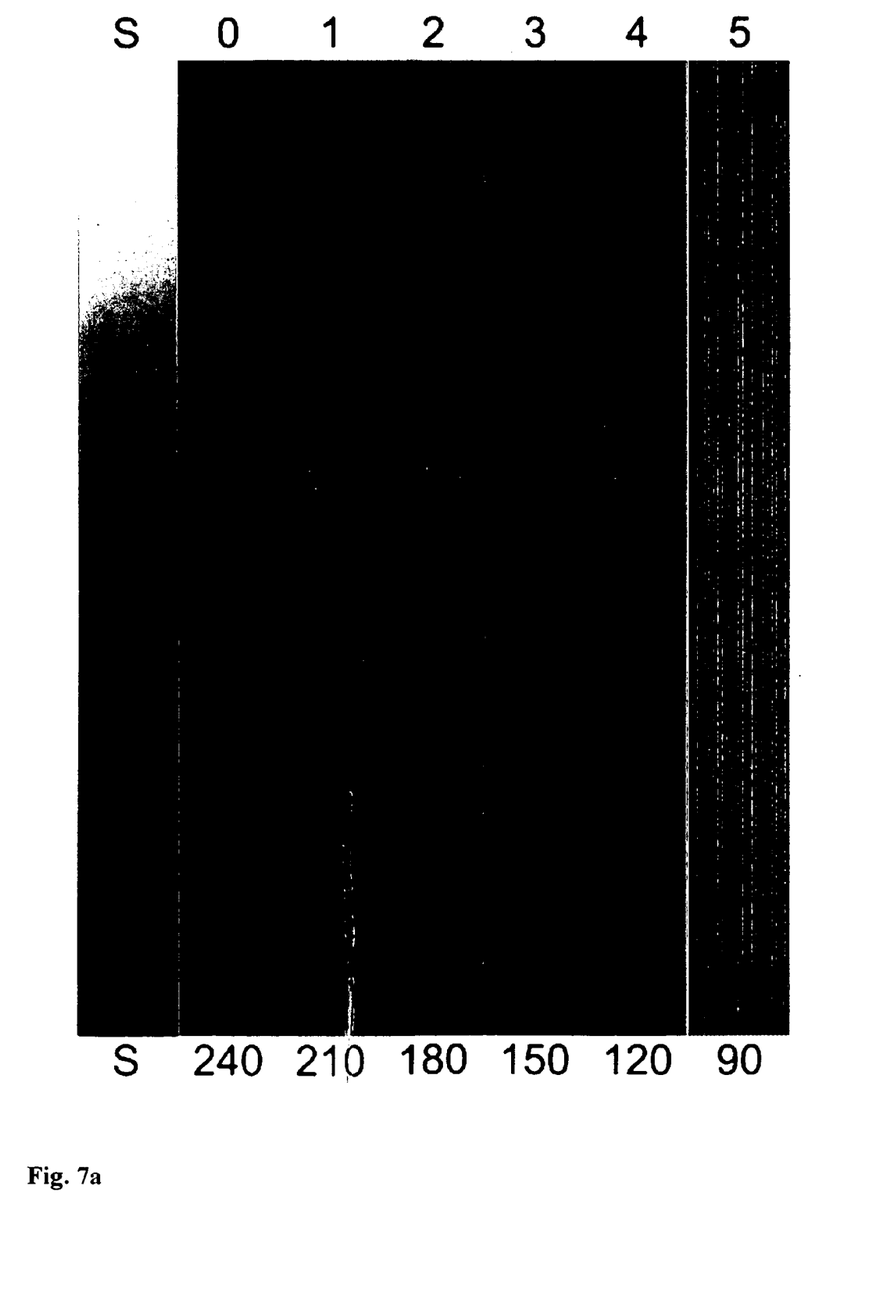
FIGS. 7a and 7b are pictorial representations of gray scale images of a test target at two different focus positions.
Figure 7B:
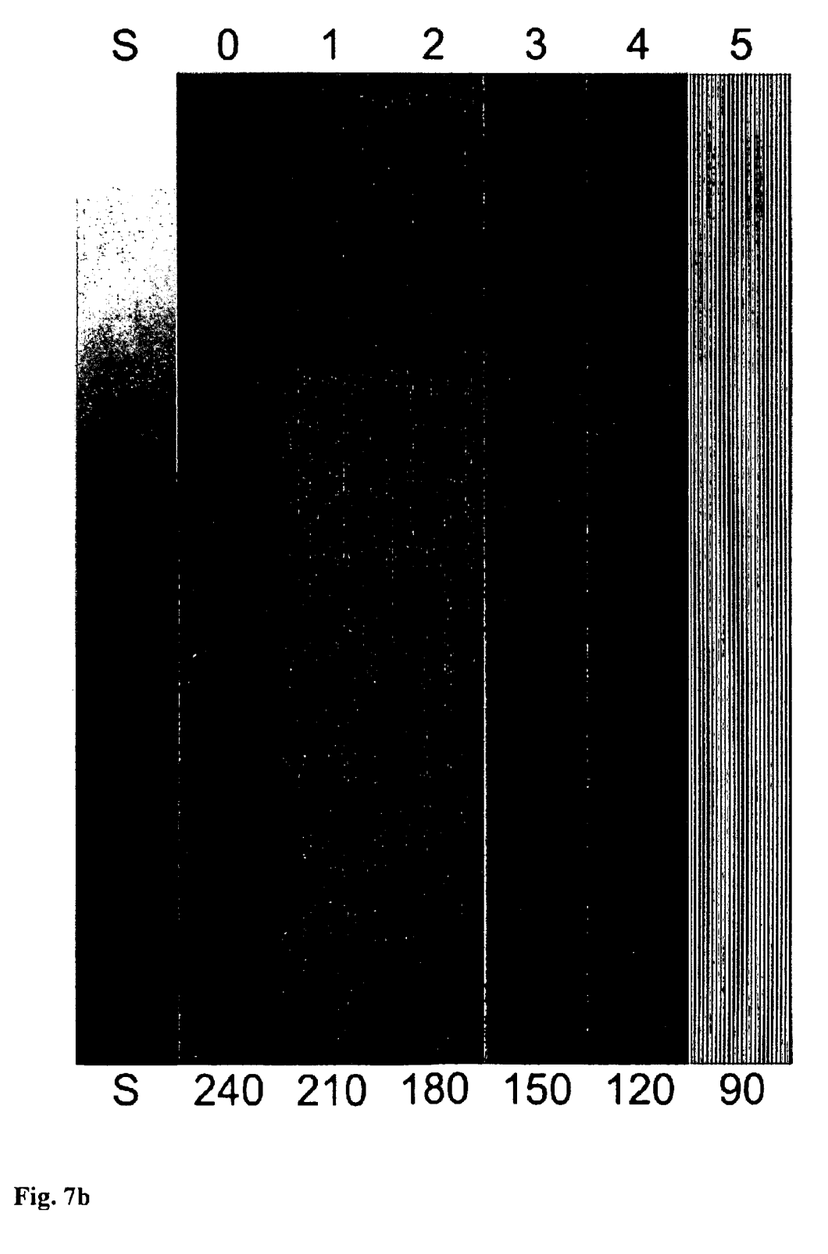
Figure 8A:
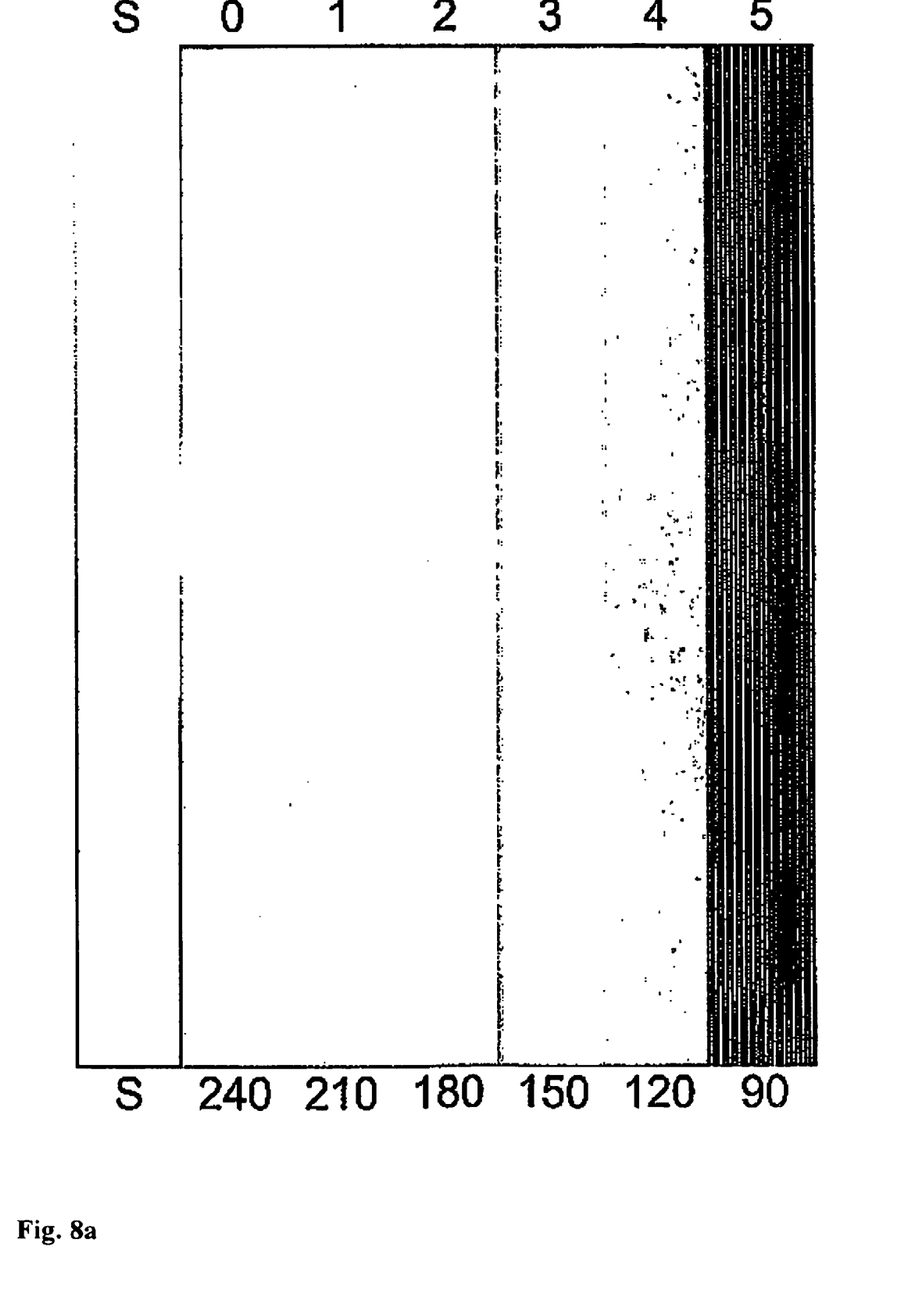
FIGS. 8a and 8b are pictorial representations of binarized gray scale images of a test target at the two different focus positions corresponding to FIGS. 7a and 7b.
Figure 8B:
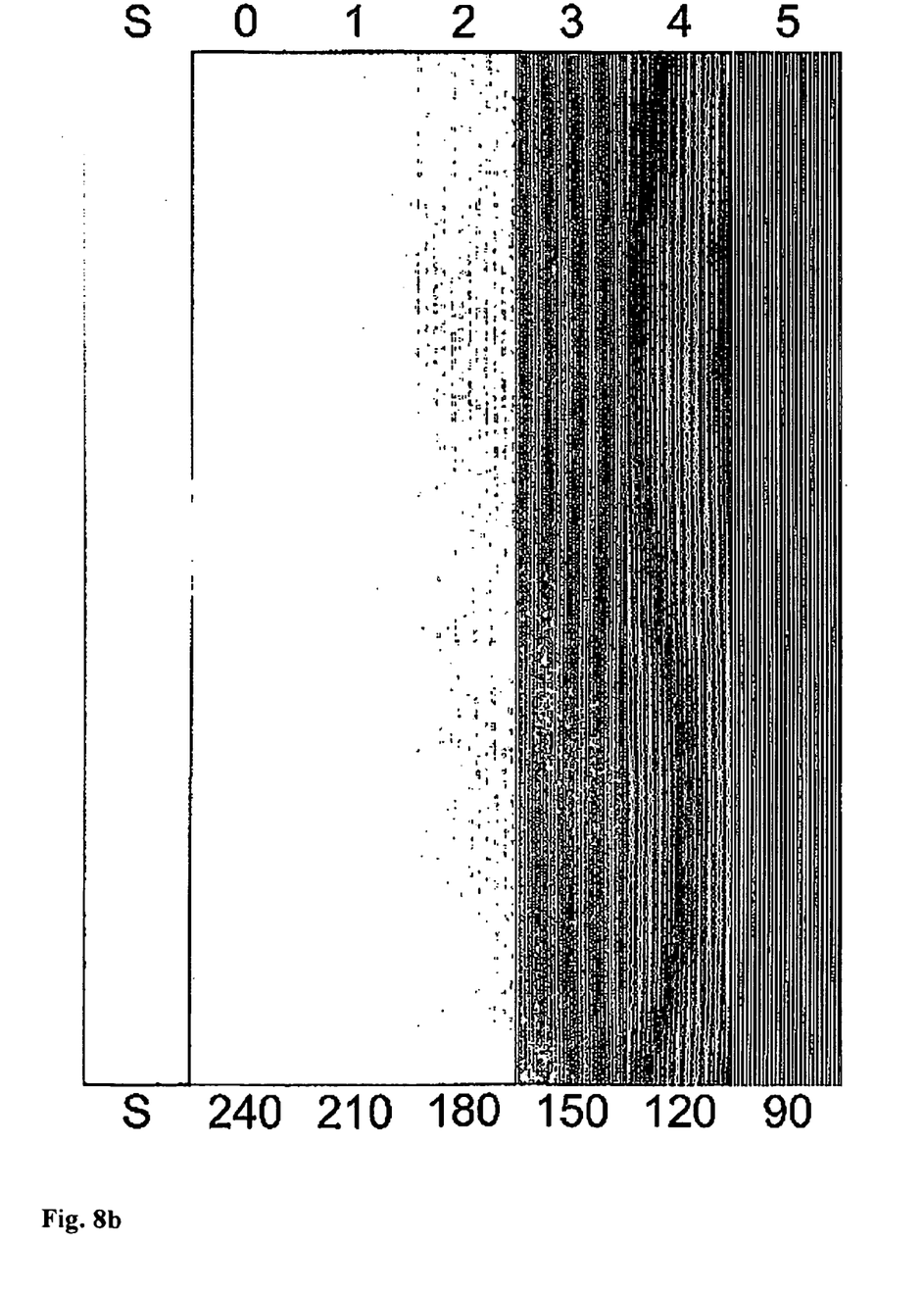

In order to illustrate the method of this invention, the following sample results are presented below. FIG. 5 is a pictorial representation of a gray scale image of a test target in substantially desired focus. FIG. 6 is a pictorial representation of a binarized gray scale image of a test target in substantially desired focus. (Both FIG. 5 and FIG. 6 exhibit Moire effects, also known as aliasing.) FIGS. 7a and 7b are pictorial representations of gray scale images of a test target at two different focus positions. FIGS. 8a and 8b are pictorial representations of binarized gray scale images of a test target at the two different focus positions corresponding to FIGS. 7a and 7b. The differences between FIGS. 8a and 8b and FIG. 6 are more discernible by visual observation than the differences between FIGS. 7a and 7b to FIG. 5.

Although the above embodiments have used a maximum desired resolution as the predetermined value exceeded by the predetermined spatial frequency of one group of line pairs, any quantity or group of quantities indicative of the desired spatial frequency response of the optical portion of the image acquisition component (such as, but not limited to, the point spread function of the optical portion of the image acquisition component and the representative distance between the target and the optical portion) could be used.

In general, the techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to data entered using the input device to perform the functions described and to generate output information. The output information may be applied to one or more output devices.

Elements and components described herein may be further divided into additional components or joined together to form fewer components for performing the same functions.

Each computer program within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable or usable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, a carrier wave, or any other medium from which a computer can read.

Although the invention has been described with respect to various embodiments, it should be realized this invention is also capable of a wide variety of further and other embodiments within the spirit and scope of the appended claims.

What is claimed is:

1. A method for determining focus of an imaging system, the method comprising the steps of:
    a) providing a test target, the test target comprising a plurality of groups of line pairs, each group from the plurality of groups of line pairs having a predetermined spatial frequency, the predetermined spatial frequency of one group being different from the predetermined spatial frequency of any adjacent group;
    b) acquiring a gray scale image of said test target;
    c) binarizing the acquired gray scale image;
    d) analyzing the binarized acquired image;
    e) adjusting focus of acquisition optics of the imaging system;
    f) repeating steps b) through e) until a substantially maximum number of line pairs of the plurality of groups of line pairs of the test target is obtained;
    whereby focus of the imaging system is determined.

2. An apparatus for determining desired focus of an imaging system, the apparatus comprising:
    a test target, said test target comprising a plurality of groups of line pairs, each group from the plurality of groups of line pairs having a predetermined spatial frequency; the predetermined spatial frequency of one group being different from the predetermined spatial frequency of any adjacent group; one predetermined spatial frequency of one group from the plurality of groups of line pairs being selected to exceed a predetermined value; wherein an image acquisition component of the imaging system is capable of acquiring a gray scale image of said test target;
    a binarizing component capable of binarizing the acquired gray scale image; and
    means for analyzing the binarized acquired image; the analyzing means being capable of determining a number of line pair groups obtained.

3. The apparatus of claim 2 wherein the predetermined value is a predetermined resolution.

4. The apparatus of claim 2 wherein the analyzing means comprise visual inspection means.

5. The apparatus of claim 2 wherein the analyzing means comprise: at least one processor;
- at least one computer readable memory having computer readable code embodied therein, said computer readable code capable of causing said at least one processor to:
- determine the number of line pair groups obtained in the binarized acquired image.

6. The apparatus of claim 5 wherein said at least one computer readable memory having computer readable code embodied therein, said computer readable code is also capable of causing said at least one processor to:
- binarize the acquired gray scale image;
- and wherein said binarizing component comprises said computer readable code.

7. The apparatus of claim 2 wherein said binarizing component comprises an edge detection binarizer.

8. The apparatus of claim 6 wherein said binarizing component comprises an edge detection binarizer.

* * * * *